(12) United States Patent
Kwon et al.

(10) Patent No.: US 11,220,951 B2
(45) Date of Patent: Jan. 11, 2022

(54) COOLING SYSTEM OF A VEHICLE AND A METHOD OF CONTROLLING THE COOLING SYSTEM

(71) Applicants: HYUNDAI MOTOR COMPANY, Seoul (KR); KIA MOTORS CORPORATION, Seoul (KR)

(72) Inventors: Mun Soon Kwon, Hwaseong-si (KR); Kwang Ki Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 46 days.

(21) Appl. No.: 16/657,549

(22) Filed: Oct. 18, 2019

(65) Prior Publication Data

US 2020/0049056 A1 Feb. 13, 2020

Related U.S. Application Data

(62) Division of application No. 15/370,793, filed on Dec. 6, 2016, now abandoned.

(30) Foreign Application Priority Data

Oct. 20, 2016 (KR) .......................... 10-2016-0136557

(51) Int. Cl.
*F01P 7/12* (2006.01)
*B60K 11/08* (2006.01)
(Continued)

(52) U.S. Cl.
CPC ................ *F01P 7/12* (2013.01); *B60K 11/02* (2013.01); *B60K 11/085* (2013.01); *F01P 7/026* (2013.01);
(Continued)

(58) Field of Classification Search
CPC ........ F01P 7/12; F01P 5/02; F01P 7/02; F01P 11/16; F01P 7/048; F01P 7/026;
(Continued)

(56) References Cited

U.S. PATENT DOCUMENTS 4,546,742 A * 10/1985 Sturges .............. B60H 1/00764
123/41.05
8,380,377 B2 2/2013 Lim et al.
(Continued)

FOREIGN PATENT DOCUMENTS

CN 201792736 U 4/2011
CN 102874068 A 1/2013
(Continued)

OTHER PUBLICATIONS

Chinese Office Action cited in corresponding Chinese app No. 201710076892.7; dated Sep. 18, 2020; 5 pp.
(Continued)

*Primary Examiner* — Joseph J Dallo
*Assistant Examiner* — Kurt Philip Liethen
(74) *Attorney, Agent, or Firm* — Lempia Summerfield Katz LLC (57) ABSTRACT

A method of controlling a cooling system includes, by an integrated controller: controller area network (CAN) checking whether CAN communication is abnormal after a vehicle is turned on and control of a cooling fan and an active air flap is initiated; single-communication checking whether communication with a cooling fan controller and an active air flap (AAF) controller is abnormal; performing a first fail-safe operation of communicating with the cooling fan controller and the AAF controller; and controlling the cooling fan and the active air flap based on signals of a first temperature sensor of the cooling fan controller and a second temperature sensor of the AAF controller.

7 Claims, 7 Drawing Sheets (51) Int. Cl.
  *F01P 11/16* (2006.01)
  *F01P 7/04* (2006.01)
  *B60K 11/02* (2006.01)
  *F01P 7/02* (2006.01)
  *B60H 1/32* (2006.01)
  *F01P 5/04* (2006.01)

(52) U.S. Cl.
  CPC ............... *F01P 7/048* (2013.01); *F01P 11/16* (2013.01); *B60H 2001/3248* (2013.01); *F01P 2005/046* (2013.01); *F01P 2025/13* (2013.01); *F01P 2025/32* (2013.01); *F01P 2031/00* (2013.01)

(58) Field of Classification Search
  CPC ............... F01P 2025/32; F01P 2031/00; F01P 2005/046; F01P 2025/13; F01P 2025/08; F01P 2050/22; B60H 2001/3248; Y02T 10/88; B60K 11/06; B60K 11/08; B60K 11/085; B60K 11/02
  See application file for complete search history.

(56) References Cited

U.S. PATENT DOCUMENTS

| | | | |
|---|---|---|---|
| 8,744,658 | B1 | 6/2014 | Moretti et al. |
| 8,899,492 | B2 | 12/2014 | Kelty et al. |
| 9,211,777 | B2 | 12/2015 | Hashigaya |
| 9,303,549 | B2 | 4/2016 | Chellan |
| 9,809,086 | B2 | 11/2017 | Kim |
| 2002/0003381 | A1 | 1/2002 | Nelson |
| 2013/0014931 | A1* | 1/2013 | Hashigaya ......... B60H 1/00828 165/287 |
| 2014/0123917 | A1 | 5/2014 | Chellan |
| 2015/0167533 | A1* | 6/2015 | Lee ............................ F01P 3/12 123/41.1 |
| 2015/0312123 | A1* | 10/2015 | Zhang ................ G06F 11/0739 709/224 |
| 2015/0322844 | A1 | 11/2015 | Kim |
| 2016/0230644 | A1* | 8/2016 | Dudar ..................... F01P 11/16 |
| 2017/0054188 | A1 | 2/2017 | Blatchley et al. |
| 2017/0125861 | A1 | 5/2017 | Machida |
| 2017/0291600 | A1 | 10/2017 | Styles et al. |
| 2017/0335785 | A1* | 11/2017 | Ozaki ..................... F02D 41/22 |
| 2017/0361698 | A1* | 12/2017 | Hussain ................... F01P 1/06 |

FOREIGN PATENT DOCUMENTS

| | | |
|---|---|---|
| CN | 203702310 U | 7/2014 |
| JP | H11218025 | 8/1999 |
| JP | 2004048987 A | 2/2004 |
| JP | 5888254 | 3/2016 |
| KR | 1020080043522 | 5/2008 |
| KR | 20110031019 | 3/2011 |
| KR | 1020130062148 | 6/2013 |
| KR | 101583923 | 1/2016 |

OTHER PUBLICATIONS

KR Notice of Allowance dated Feb. 25, 2018, Notice of Allowance in the corresponding Korean Patent Application No. 10-2016-0136557; dated Feb. 25, 2018; 5 pages.
KR Office Action dated Dec. 19, 2017, Office Action in corresponding Korean Patent Application No. 10-2016-0136557, dated Dec. 19, 2017; 4 pages.

* cited by examiner

COOLING SYSTEM OF A VEHICLE AND A METHOD OF CONTROLLING THE COOLING SYSTEM

CROSS-REFERENCE TO RELATED APPLICATION

This application claims priority to and is a division of co-pending U.S. patent application Ser. No. 15/370,793 entitled "COOLING SYSTEM OF A VEHICLE AND A METHOD OF CONTROLLING THE COOLING SYSTEM", filed Dec. 6, 2016, which claims priority to and the benefit of Korean Patent Application No. 10-2016-0136557, filed in the Korean Intellectual Property Office on Oct. 20, 2016. The entire contents of these prior filed applications are incorporated herein by reference.

BACKGROUND

1. Field

The present disclosure relates to a cooling system of a vehicle and a method of controlling the same, and more particularly, to control of a cooling fan and an active air flap of an engine.

2. Description of the Related Art

A vehicle includes a plurality of heat sources such as an engine and a motor and, in this regard, a temperature of a heat source needs to be maintained and managed at an appropriate level. Thus, the vehicle includes a cooling system including a plurality of cooling devices.

As an engine, a water-cooled engine for circulating cooling water and dissipating heat may be used. A vehicle includes a cooling fan to cool a radiator required in a cooling device of a water-cooled engine, and cooling air from the cooling fan directly and indirectly affects cooling of almost all components in an engine room. For example, the cooling air may cool the radiator, cool a condenser of an air conditioner, cool a motor of a hybrid vehicle, and partially cool air of an engine.

In addition, an active air flap (AAF) installed at a front portion of a vehicle for controlling an amount of air introduced into an engine room controls the amount of air introduced into the cooling fan. Thus, there is a need for control that is very closely related to control of a cooling fan.

The above information disclosed in this Background section is only for enhancement of understanding of the background and therefore it may contain information that does not form the prior art that is already known in this country to a person of ordinary skill in the art.

SUMMARY

The present disclosure has been made in view of the above problems, and it is an object of the present disclosure to provide a cooling system of a vehicle and a method of controlling the same, for performing close cooperative-control of a cooling fan and an active air flap irrespective of other hardware components of a vehicle so as to maximize cooling performance of the vehicle and also embodying sufficient cooling performance of the vehicle when communication of the vehicle is abnormal or failure occurs in a sensor related to a cooling system, thereby enhancing the reliability of the vehicle cooling system.

In accordance with an aspect, the above and other objects can be accomplished by the provision of a cooling system of a vehicle, including an integrated controller for controlling a cooling fan and an active air flap, the cooling fan connected to the integrated controller through a single data line, and the active air flap connected to the integrated controller through a single data line, wherein the integrated controller is configured to receive signals of temperatures of cooling water and ambient air via controller area network (CAN) communication using two data lines.

The cooling fan may include a cooling fan controller connected to the integrated controller through the single data line, and the cooling fan controller may include a first temperature sensor for measuring ambient temperature.

The active air flap may include an active air flap (AAF) controller connected to the integrated controller through the single data line, and the AAF controller may include a second temperature sensor for measuring ambient temperature.

An engine controller that receives a signal of a cooling water sensor may be configured to transmit information on temperature of cooling water to the integrated controller via CAN communication, and a full automatic temperature controller (FATC) that receives signals of an ambient air sensor and an air conditioner coolant pressure sensor may be configured to transmit signals of ambient air and air conditioner coolant pressure to the integrated controller via CAN communication.

In accordance with another aspect, the above and other objects can be accomplished by the provision of a method of controlling the aforementioned cooling system, the method including CAN checking whether CAN communication is abnormal by the integrated controller after the vehicle is turned on and control of the cooling fan and the active air flap is initiated. As a result of the CAN checking, upon determining that CAN communication is abnormal, the method includes single-communication checking whether communication with the cooling fan controller and the AAF controller is abnormal by the integrated controller. As a result of the single-communication checking upon determining that communication is abnormal, the method includes performing a first fail-safe operation of communicating with the cooling fan controller and the AAF controller and controlling the cooling fan and the active air flap based on signals of the first temperature sensor and the second temperature sensor, by the integrated controller.

The method may further include, as a result of the single-communication checking, upon determining that communication is abnormal, performing a second fail-safe operation. In the second fail-safe operation, the cooling fan controller may turn off the cooling fan at a temperature less than a predetermined lower limit temperature, control the cooling fan with maximum output at a temperature equal to or greater than a predetermined upper limit temperature, and maintain control output of the cooling fan as output set prior to determination that communication is abnormal in the single-communication checking at a temperature between the lower limit temperature and the upper limit temperature, based on a signal of the first temperature sensor. Additionally, the AAF controller may close the active air flap at a temperature less than a predetermined lower limit temperature, open the active air flap to a maximum degree at a temperature equal to or greater than a predetermined upper limit temperature, and maintain an opening degree of the active air flap in a state set prior to determination that communication is abnormal in the single-communication checking at a temperature between the lower limit temperature and the upper limit temperature, based on a signal of the second temperature sensor.

In accordance with another aspect, the above and other objects can be accomplished by the provision of a method of controlling the aforementioned cooling system, the method including sensor-output checking whether outputs of the ambient air sensor or the air conditioner coolant pressure sensor are abnormal while the vehicle is turned on and an air conditioner is turned on, by the integrated controller. As a result of the sensor-output checking, upon determining that the outputs are abnormal, the method includes two-sensor determining whether both the outputs of the ambient air sensor and the air conditioner coolant pressure sensor are abnormal. As a result of the two-sensor determining, upon determining that both sensors are abnormal, the method includes performing a third fail-safe operation in which the integrated controller controls the cooling fan with maximum output and controls the active air flap to be opened to a maximum degree.

The method may further include, as a result of the two-sensor determining, upon determining that only one of the two sensors is abnormal, estimating an output value of an abnormal sensor based on an output value of the other normal sensor and performing a fourth fail-safe operation using the estimated value to control the cooling fan or the active air flap, by the integrated controller.

When an output value of the normal sensor is within a predetermined compensated range set as an intermediate portion of a whole output range of a corresponding sensor, the integrated controller may estimate an output value of the other abnormal sensor and perform the fourth fail-safe operation.

BRIEF DESCRIPTION OF THE DRAWINGS

The above and other objects, features and other advantages are more clearly understood from the following detailed description taken in conjunction with the accompanying drawings, in which.

DETAILED DESCRIPTION

Hereinafter, a light module for a vehicle according to exemplary embodiments will be described with reference to the accompanying drawings.

Figure 1:
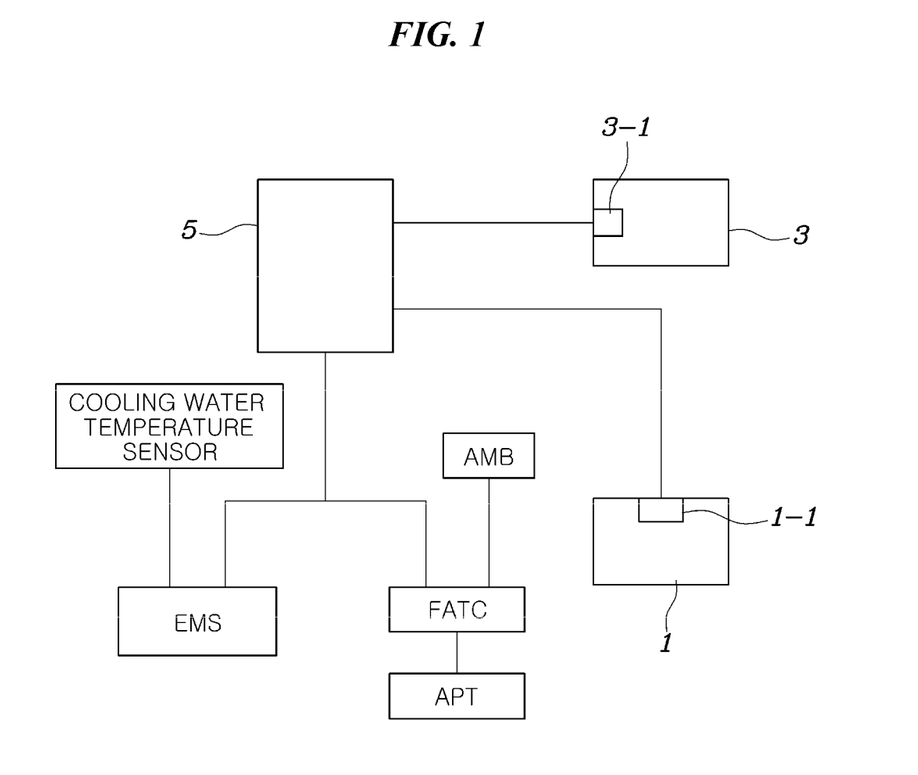
FIG. 1 is a diagram illustrating a structure of a cooling system of a vehicle according to an example.
Figure 2:
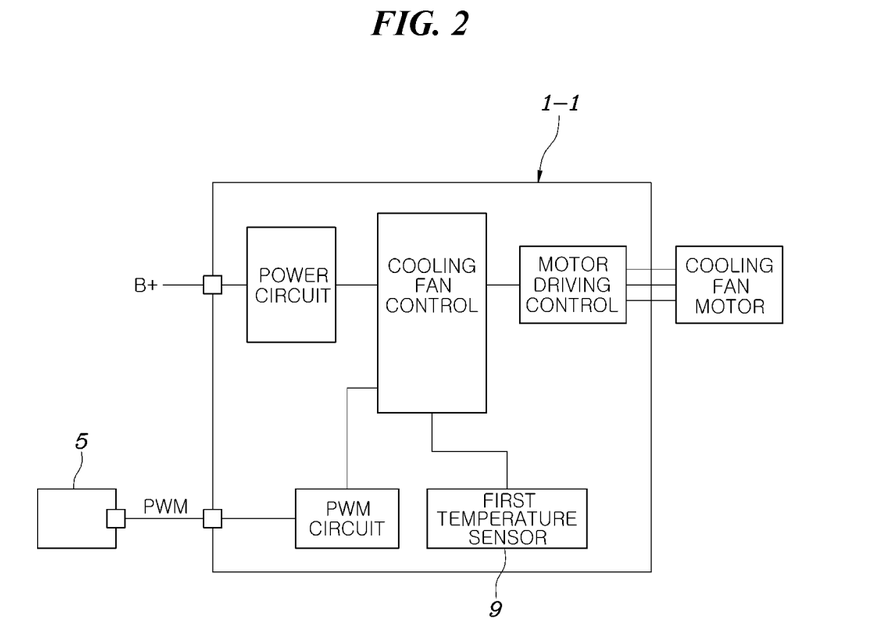
FIG. 2 is a block diagram of an example of a cooling fan controller included in a cooling fan illustrated in FIG. 1.
Figure 3:
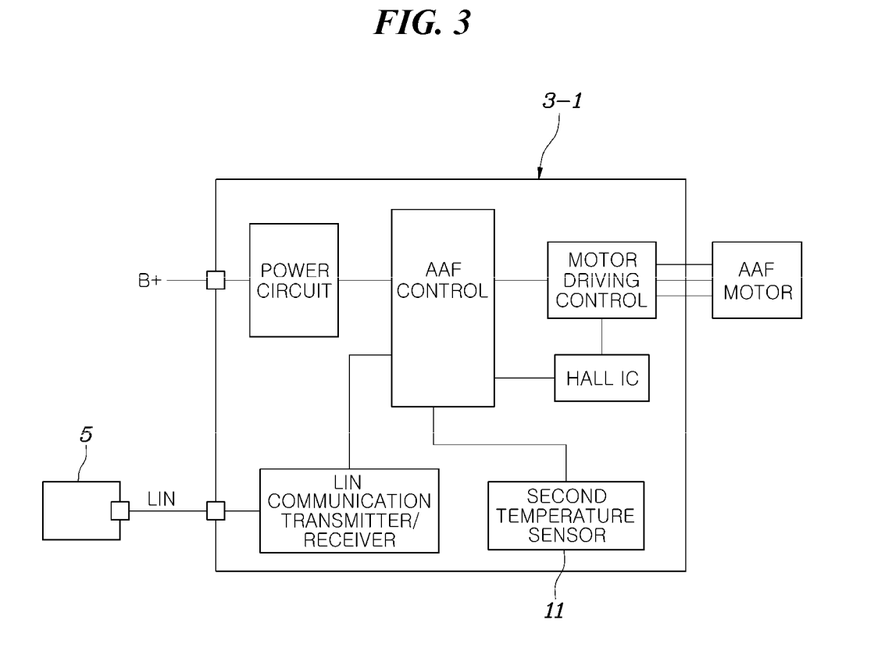
FIG. 3 is a block diagram of an example of an active air flap (AAF) controller included in an active air flap illustrated in FIG. 1.

Referring to FIGS. 1 to 3, a cooling system of a vehicle may include an integrated controller 5 for controlling a cooling fan 1 and an active air flap 3. The cooling fan 1 is connected to the integrated controller 5 through a single data line, and the active air flap 3 is connected to the integrated controller 5 through a single data line.

The single data line refers to a local interconnect network (LIN) communication line or a pulse width modulation (PWM) line and, thus, is used to collectively indicate communication elements including an electric line for control as one conductive line.

For reference, a cooling fan controller 1-1 of FIG. 2 is illustrated as connected to the integrated controller 5 via a PWM method and an AAF controller 3-1 of FIG. 3 is illustrated as connected to the integrated controller 5 via LIN communication, but the LIN communication method and the PWM method may be used interchangeably.

Here, the integrated controller 5 may be configured to receive signals of temperatures of cooling water and ambient air, and a refrigerant pressure of an air conditioner through controller area network (CAN) communication using two data lines.

In an embodiment, an engine management system (EMS) for receiving a signal of a cooling water temperature sensor 7 may be configured to transmit information on a temperature of cooling water to the integrated controller 5 via CAN communication. A full automatic temperature controller (FATC) for receiving signals of an ambient air sensor AMB and an air conditioner coolant pressure sensor APT may be configured to transmit signals of ambient air and air conditioner coolant pressure to the integrated controller 5 via CAN communication. In this regard, the EMS may be replaced with a motor control unit (MCU), a vehicle control unit (VCU), or the like. In this case, each of the MCU and the VCU may be configured to receive a signal of the cooling water temperature sensor 7.

That is, the cooling system may be configured to maintain a structure of the integrated controller 5 for controlling the cooling fan 1 and the active air flap 3 without being changed even if a controller for receiving a signal of the cooling water temperature sensor 7 is an EMS or is replaced by a motor controller, a vehicle controller, or the like. Therefore, the cooling system according to the present disclosure may be easily applied to various vehicle platforms and cooperative control of the cooling fan 1 and the active air flap 3 may be structurally enabled in the same controller.

The cooling system may be configured in such a way that the integrated controller 5 is capable of performing CAN communication only between the EMS and the FATC and performing LIN or PWM communication with the cooling fan controller 1-1 and the AAF controller 3-1. Therefore, the number of controllers associated with CAN communication of a vehicle may be reduced compared with the conventional case so as to prevent communication delay and failure of CAN communication and cost taken to embody a communication system is relatively inexpensive so as to relatively reduce manufacturing costs of vehicles. That is, manufacturing costs of a vehicle communication system may be reduced while the safety and reliability of the system are enhanced.

The cooling fan 1 may include the cooling fan controller 1-1 connected to the integrated controller 5 through the single data line and the cooling fan controller 1-1 may include a first temperature sensor 9 for measuring ambient temperature.

The active air flap 3 may include the AAF controller 3-1 connected to the integrated controller 5 through the single data line and the AAF controller 3-1 may include a second temperature sensor 11 for measuring ambient temperature.

The aforementioned cooling system according to the present disclosure may stepwise embody a fail-safe function using the first temperature sensor 9 and the second temperature sensor 11 when failure occurs in a communication system, thereby further enhancing the reliability of a cooling device, as described below.

Figure 4:
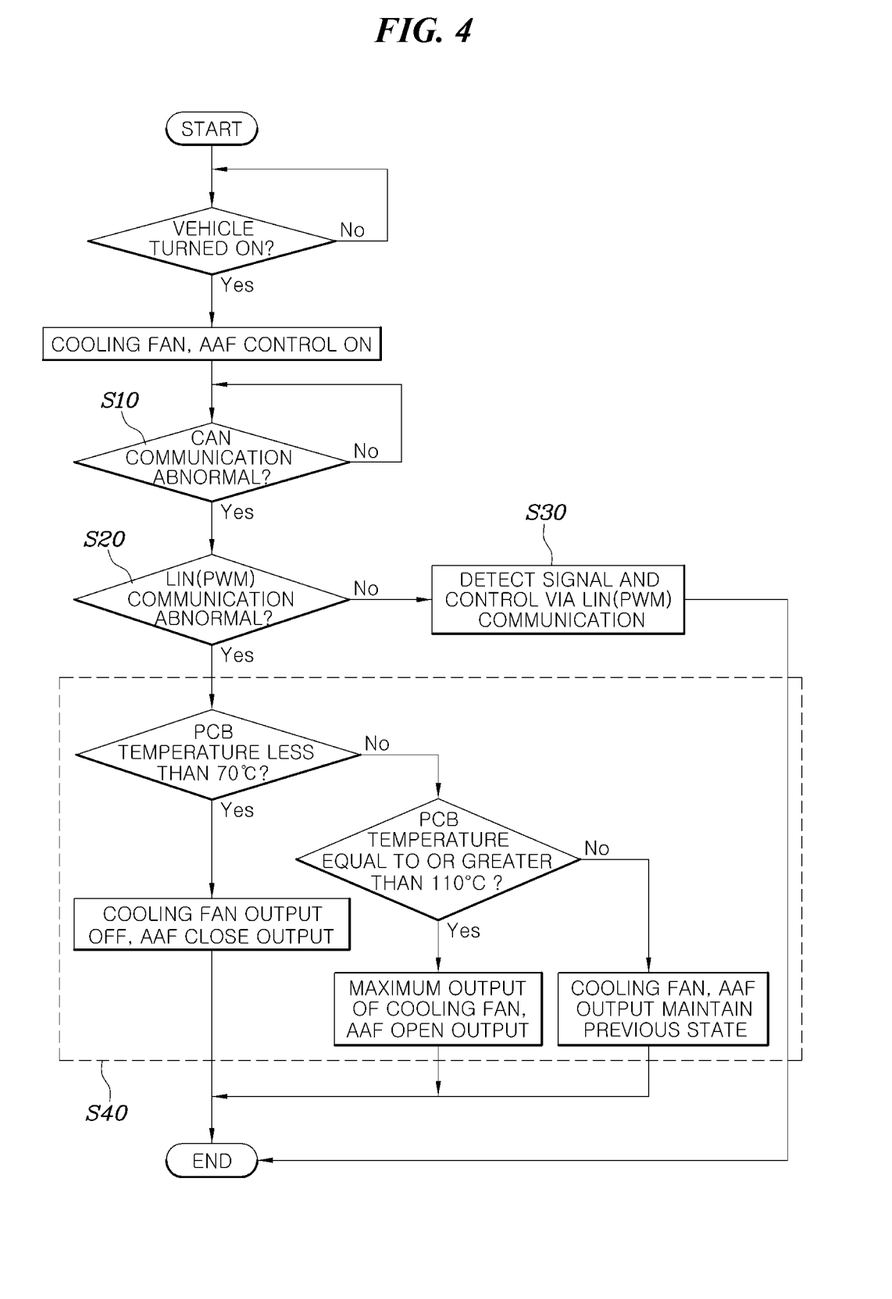
FIG. 4 is a flowchart illustrating a method of controlling a cooling system of a vehicle according to an embodiment.

Referring to FIG. 4, a method of controlling a cooling system of a vehicle according to the present disclosure may include CAN determining (S10) whether CAN communication is abnormal by the integrated controller 5 after the vehicle is turned on and control of the cooling fan 1 and the active air flap 3 is initiated. As a result of the CAN checking (S10), upon determining that CAN communication is abnormal, the method may include single-communication checking (S20) whether communication with the cooling fan controller 1-1 and the AAF controller 3-1 is abnormal, by the integrated controller 5. As a result of the single-communication checking (S20), upon determining that communication is abnormal, the method may include performing a first fail-safe operation (S30) of communicating with the cooling fan controller 1-1 and the AAF controller 3-1 and controlling the cooling fan and the active air flap based on signals of the first temperature sensor 9 and the second temperature sensor 11, by the integrated controller 5.

That is, when CAN communication is abnormal but LIN communication or PWM communication of the integrated controller 5 with the cooling fan and the active air flap is normal, the integrated controller 5 may apply a control signal to the cooling fan controller 1-1 and the AAF controller 3-1 via LIN communication or PWM communication based on signals of the first temperature sensor 9 and the second temperature sensor 11 so as to perform the first fail-safe operation (S30) of controlling the cooling fan 1 and the active air flap 3 and to continuously provide smooth and appropriate cooling performance.

As a result of the single-communication checking (S20), upon determining that communication is abnormal, a second fail-safe operation (S40) may be performed. Additionally, in the second fail-safe operation (S40), the cooling fan controller 1-1 may turn off the cooling fan 1 at a temperature less than a predetermined lower limit temperature, control the cooling fan 1 with maximum output at a temperature equal to or greater than a predetermined upper limit temperature, and maintain control output of the cooling fan 1 as output set prior to determination that communication is abnormal in the single-communication checking (S20) at a temperature between the lower limit temperature and the upper limit temperature, based on a signal of the first temperature sensor 9. The AAF controller 3-1 may close the active air flap 3 at a temperature less than a predetermined lower limit temperature, open the active air flap 3 to a maximum degree at a temperature equal to or greater than a predetermined upper limit temperature, and maintain an opening degree of the active air flap 3 in a state set prior to determination that communication is abnormal in the single-communication checking (S20) at a temperature between the lower limit temperature and the upper limit temperature, based on a signal of the second temperature sensor 11.

That is, in the second fail-safe operation (S40), the cooling fan controller 1-1 or the AAF controller 3-1 is not capable of receiving control information of the integrated controller 5 any longer. Therefore, cooling may not be determined to be required at a temperature less than the lower limit temperature, cooling may be determined to be seriously required at a temperature equal to or greater than the upper limit temperature, and a current cooling degree may be determined to be at an appropriate level at a temperature between the lower limit temperature and the upper limit temperature, based on measured values of the first temperature sensor 9 and the second temperature sensor 11 as a self-temperature sensor. Additionally, the cooling fan 1 and the active air flap 3 may be controlled according to the result. Therefore, cooling performance that is not almost insufficient may be provided even if the performance is not optimized according to cooling requirements of a vehicle.

Accordingly, the lower limit temperature and the upper limit temperature may be designed and determined according to experimentation and interpretations according to the aforementioned technological objectives. In an embodiment, the lower limit temperature may be set to 70° C. and the upper limit temperature may be set to 110° C., as illustrated in FIG. 4.

Referring to FIGS. 5 to 8, the method of controlling a cooling system of a vehicle according to the present disclosure may include sensor-output checking (S110) whether outputs of the ambient air sensor AMB or the air conditioner coolant pressure sensor APT are abnormal while the vehicle is turned on and an air conditioner is turned on, by the integrated controller 5. As a result of the sensor-output checking (S110), upon determining that the outputs are abnormal, the method may include two-sensor determining (S120) whether both the outputs of the ambient air sensor AMB and the air conditioner coolant pressure sensor APT are abnormal. As a result of the two-sensor determining (S120), upon determining that both sensors are abnormal, the method may include performing a third fail-safe operation (S130) in which the integrated controller 5 controls the cooling fan 1 with maximum output and controls the active air flap 3 to be opened to a maximum degree.

Figure 5:
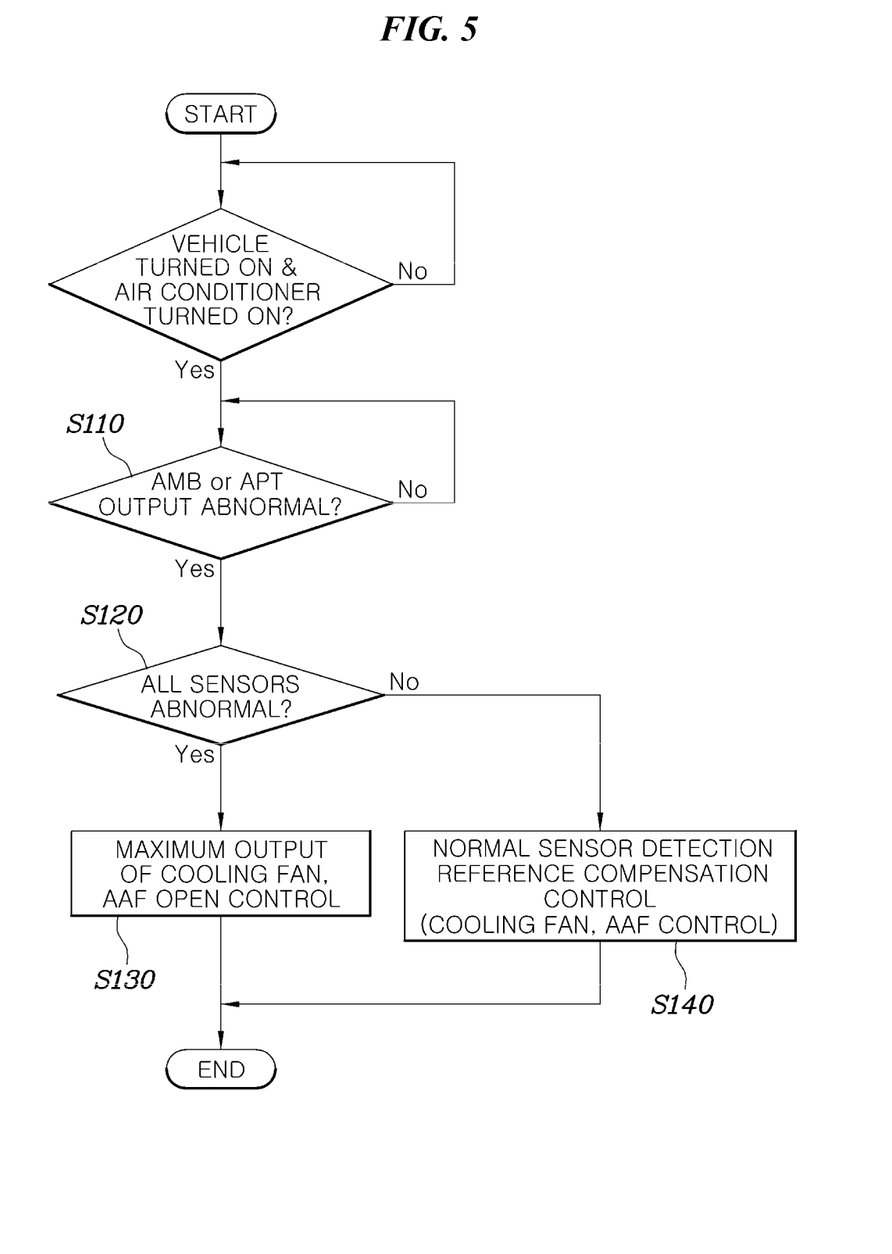
FIG. 5 is a flowchart illustrating a method of controlling a cooling system of a vehicle according to another embodiment.

That is, when the integrated controller 5 is configured to receive a signal of the ambient air sensor AMB and a signal of the air conditioner coolant pressure sensor APT and to calculate a control amount for controlling the cooling fan 1 and the active air flap 3, upon determining that both of the ambient air sensor AMB and the air conditioner coolant pressure sensor APT are abnormal, the integrated controller 5 may perform the third fail-safe operation (S130) to control the cooling fan 1 with maximum output and to open the active air flap 3 to a maximum degree, thereby achieving sufficient cooling performance.

However, as a result of the two-sensor determining (S120), upon determining that only one of the two sensors is abnormal, the integrated controller 5 may estimate an output value of an abnormal sensor based on an output value of the other normal sensor and perform a fourth fail-safe operation (S140) using the estimated value to control the cooling fan 1 or the active air flap 3.

When an output value of the normal sensor is within a predetermined compensated range set as an intermediate portion of a whole output range of a corresponding sensor, the integrated controller 5 may estimate an output value of the other abnormal sensor and perform the fourth fail-safe operation (S140).

Figure 6:
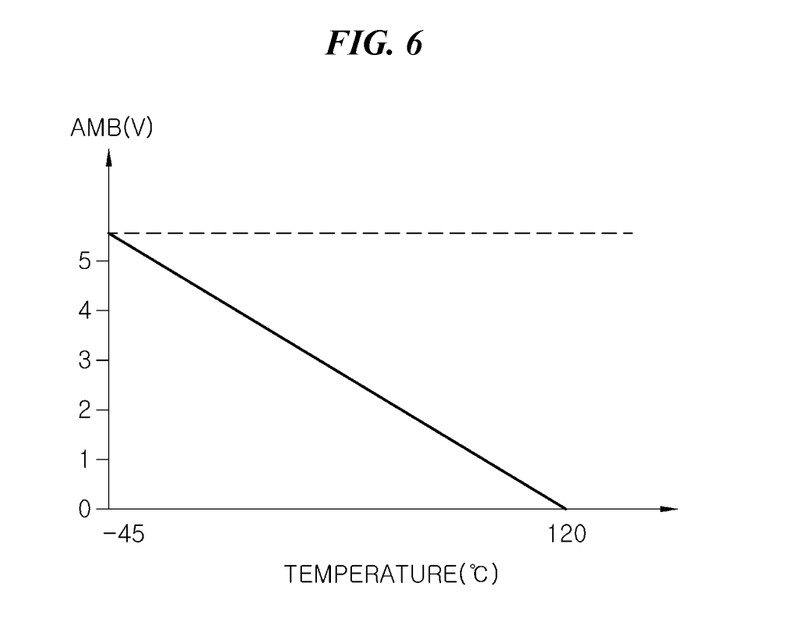
FIG. 6 is a graph showing normal output feature of an ambient temperature sensor according to an example.
Figure 7:
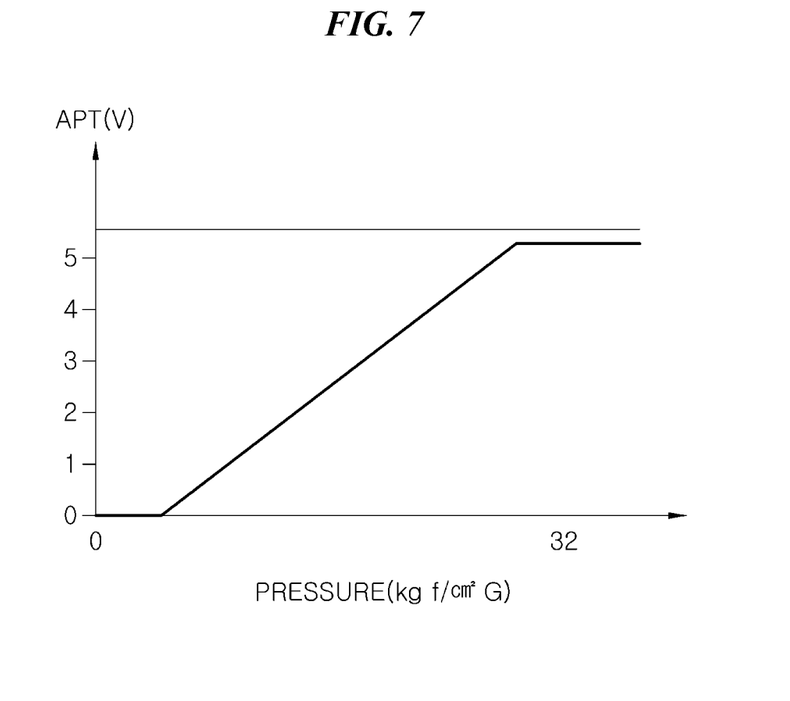
FIG. 7 is a graph showing normal output feature of an air conditioner coolant pressure sensor according to an example.
Figure 8:
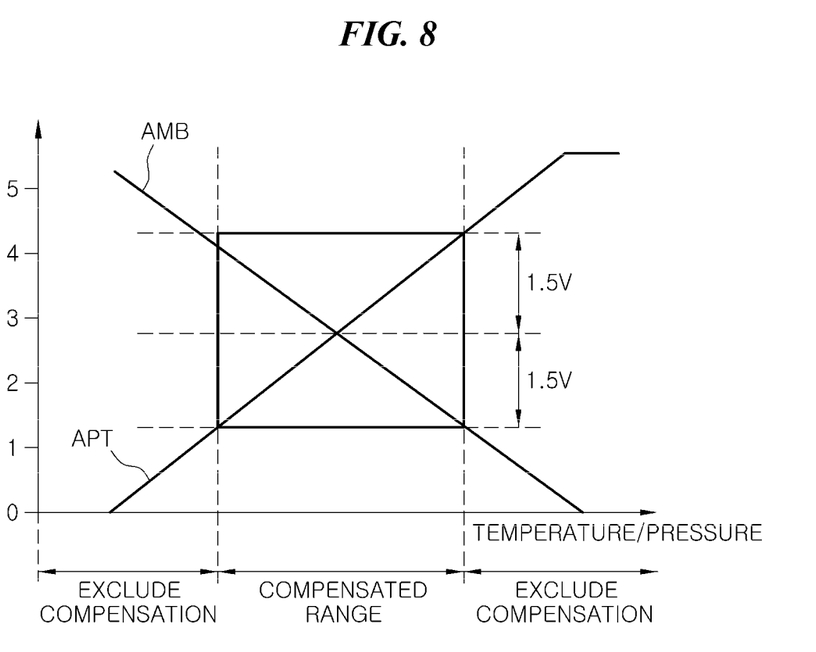
FIG. 8 is a graph for explanation of a compensated range for a fourth fail-safe operation according to an example.

For example, as illustrated in FIG. 6, when an output of the abnormal ambient air sensor AMB is output as a voltage according to a temperature and, as illustrated in FIG. 7, an output value of the normal air conditioner coolant pressure sensor APT is output as a voltage according to pressure, an intermediate portion of a whole output range of each sensor may be set as a compensated range, which is represented as shown in FIG. 8. In this case, when only one sensor is abnormal within in the compensated range, a signal of the other normal sensor may be multiplied by a predetermined correction coefficient and considered as a signal of the abnormal sensor and the outputs may be used to calculate a control amount of the cooling fan 1 and the active air flap 3, thereby further enhancing the safety and reliability of the cooling system.

Here, the correction coefficient may be set to 1 as an extreme example. For example, when failure occurs in the air conditioner coolant pressure sensor APT and the ambient air sensor AMB is normal, that is, when an output value of the ambient air sensor AMB is within the compensated value, the output value of the ambient air sensor AMB may be replaced with the output value of the air conditioner coolant pressure sensor APT without change.

The compensated range of each sensor may be set as a range for providing some degree of reliability for estimating an output value of the counterpart abnormal sensor except for a range of a signal indicating an extreme state of two sensors from a whole output range and, for example, the compensated range may be set as only the remaining 80% except for 20% of opposite ends of a whole output range.

In the case of the aforementioned failure cases, cooling performance of a vehicle cooling system may also be continuously, gradually, and stably provided and maintained, thereby enhancing the reliability and safety of the cooling system.

As is apparent from the above description, according to the present disclosure, a cooling fan and an active air flap may perform close cooperative-control irrespective of other hardware components of a vehicle so as to maximize cooling performance of the vehicle and may also embody sufficient cooling performance of the vehicle when communication of the vehicle is abnormal or failure occurs in a sensor related to a cooling system, thereby enhancing the reliability of the vehicle cooling system.

Although the embodiments have been described above with reference to the accompanying drawings, those skilled in the art will appreciate that the present disclosure can be implemented in various other embodiments without changing the technical ideas or features thereof. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

What is claimed is:

1. A method of controlling a cooling system, the method comprising:
    controller area network (CAN) checking, by an integrated controller, whether CAN communication is abnormal after a vehicle is turned on and control of a cooling fan and an active air flap is initiated;
    single-communication checking, by the integrated controller, whether communication with a cooling fan controller and an active air flap (AAF) controller is abnormal;
    performing, by the integrated controller, a first fail-safe operation of communicating with the cooling fan controller and the AAF controller;
    controlling, by the integrated controller, the cooling fan and the active air flap based on signals of a first temperature sensor of the cooling fan controller and a second temperature sensor of the AAF controller;
    sensor-output checking, by the integrated controller, whether outputs of an ambient air sensor or an air conditioner coolant pressure sensor are abnormal while the vehicle is turned on and an air conditioner is turned on;
    two-sensor determining, by the integrated controller, as a result of the sensor-output checking, upon determining that the outputs of the ambient air sensor or the air conditioner coolant pressure sensor are abnormal, whether both of the outputs of the ambient air sensor and the air conditioner coolant pressure sensor are abnormal; and
    performing, by the integrated controller, a third fail-safe operation, as a result of the two-sensor determining, upon determining that both of the outputs of the ambient air sensor and the air conditioner coolant pressure sensor are abnormal, wherein in the third fail-safe operation, the integrated controller controls the cooling fan with maximum output and controls the active air flap to be opened to a maximum degree.

2. The method of claim 1, further comprising:
    performing a second fail-safe operation, wherein, in the second fail-safe operation, based on a signal of the first temperature sensor, the cooling fan controller: (1) turns off the cooling fan at a temperature less than a predetermined lower limit temperature, (2) controls the cooling fan with maximum output at a temperature equal to or greater than a predetermined upper limit temperature, or (3) maintains control output of the cooling fan as output set prior to determination that communication is abnormal in the single-communication checking at a temperature between the lower limit temperature and the upper limit temperature, and
    wherein, based on a signal of the second temperature sensor, the AAF controller: (1) closes the active air flap at a temperature less than a predetermined lower limit temperature, (2) opens the active air flap to a maximum degree at a temperature equal to or greater than a predetermined upper limit temperature, or (3) maintains an opening degree of the active air flap in a state set prior to determination that communication is abnormal in the single-communication checking at a temperature between the lower limit temperature and the upper limit temperature.

3. The method of claim 1, further comprising:
    performing a second fail-safe operation, wherein, based on a signal of the first temperature sensor, the cooling fan controller: (1) turns off the cooling fan at a temperature less than a predetermined lower limit temperature, (2) controls the cooling fan with maximum output at a temperature equal to or greater than a predetermined upper limit temperature, or (3) maintains control output of the cooling fan as output set prior to determination that communication is abnormal in the single-communication checking at a temperature between the lower limit temperature and the upper limit temperature.

4. The method of claim 1, further comprising:
    performing a second fail-safe operation, wherein, based on a signal of the second temperature sensor, the AAF controller: (1) closes the active air flap at a temperature less than a predetermined lower limit temperature, (2) opens the active air flap to a maximum degree at a temperature equal to or greater than a predetermined upper limit temperature, or (3) maintains an opening degree of the active air flap in a state set prior to determination that communication is abnormal in the single-communication checking at a temperature between the lower limit temperature and the upper limit temperature.

5. A method of controlling a cooling system, the method comprising:
   sensor-output checking, by an integrated controller, whether outputs of an ambient air sensor or an air conditioner coolant pressure sensor are abnormal while a vehicle is turned on and an air conditioner is turned on;
   determining whether both the outputs of the ambient air sensor and the air conditioner coolant pressure sensor are abnormal; and
   performing a fail-safe operation, wherein: (1) when the determining identifies that both of the ambient air sensor and the air conditioner coolant pressure sensor are abnormal, the integrated controller controls the cooling fan with maximum output and controls the active air flap to be opened to a maximum degree, or (2) when the determining identifies that only one sensor of the ambient air sensor and the air conditioner coolant pressure sensor is abnormal, the integrated controller estimates an output value of the abnormal sensor based on an output value of the other normal sensor.

6. The method of claim 5, wherein only one of the two sensors is abnormal, the method further comprises:
   performing, by the integrated controller, an additional fail-safe operation using the estimated value to control the cooling fan or the active air flap.

7. The method of claim 6, wherein, when the output value of the normal sensor is within a predetermined compensated range set as an intermediate portion of a whole output range of a corresponding sensor, the integrated controller estimates the output value of the abnormal sensor and performs the additional fail-safe operation.

\* \* \* \* \*